June 5, 1945.  A. A. SCARLETT ET AL  2,377,578
AGRICULTURAL IMPLEMENT
Filed Oct. 10, 1942   2 Sheets-Sheet 2
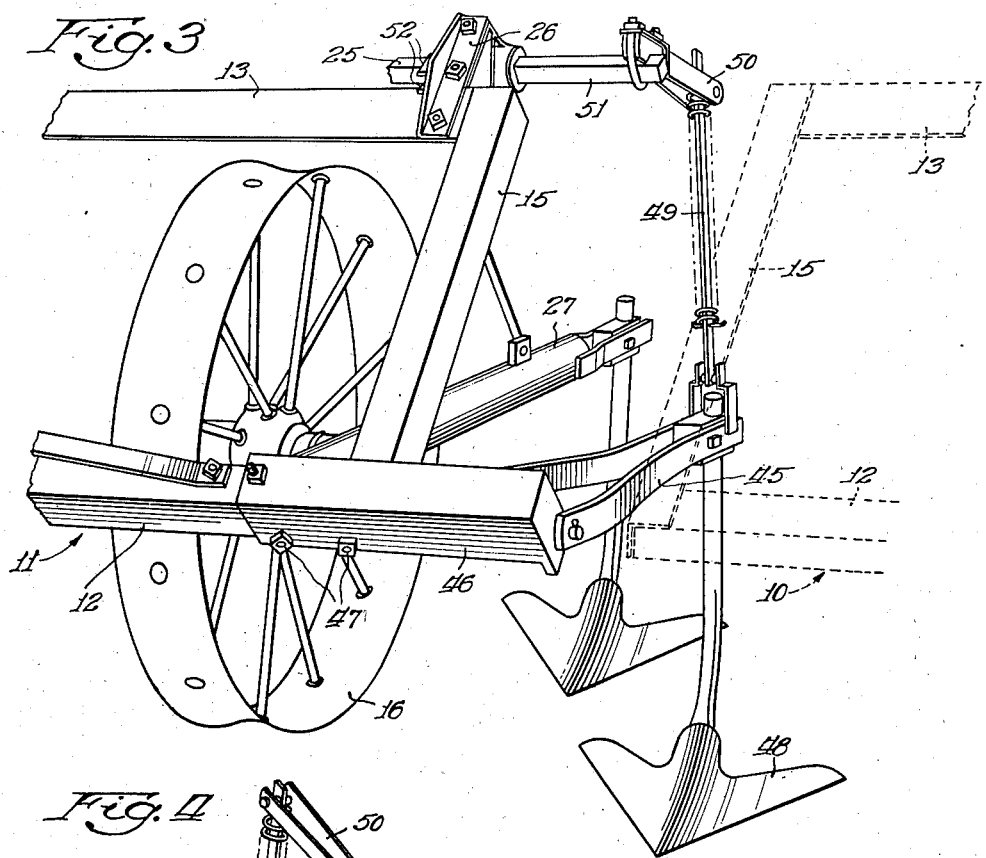
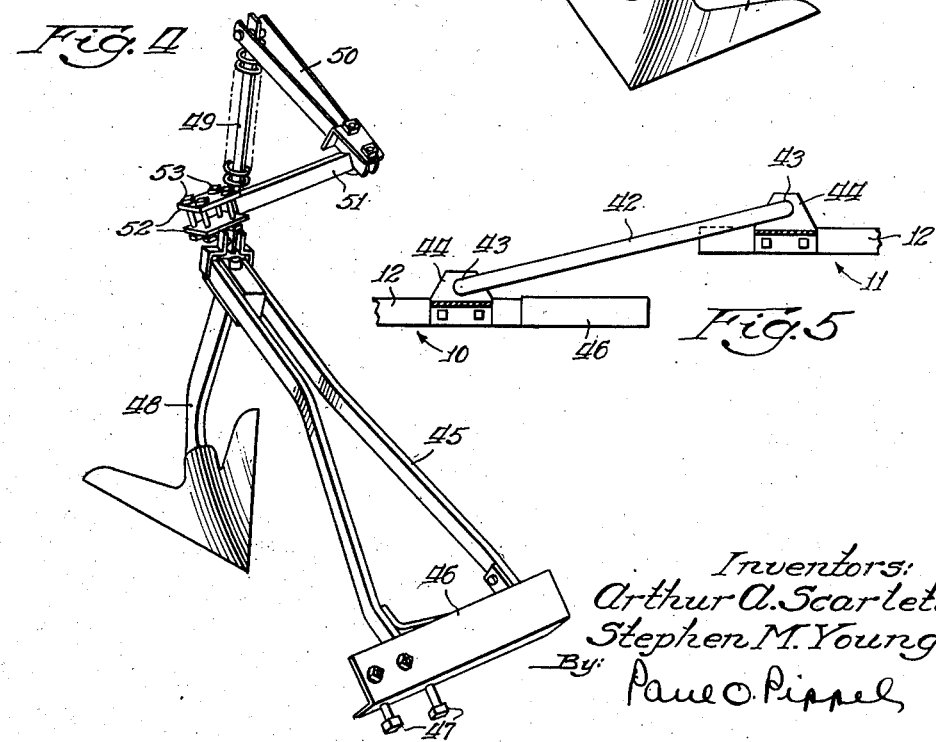
Inventors:
Arthur A. Scarlett
Stephen M. Young
By: Paul O. Pippel
Atty.

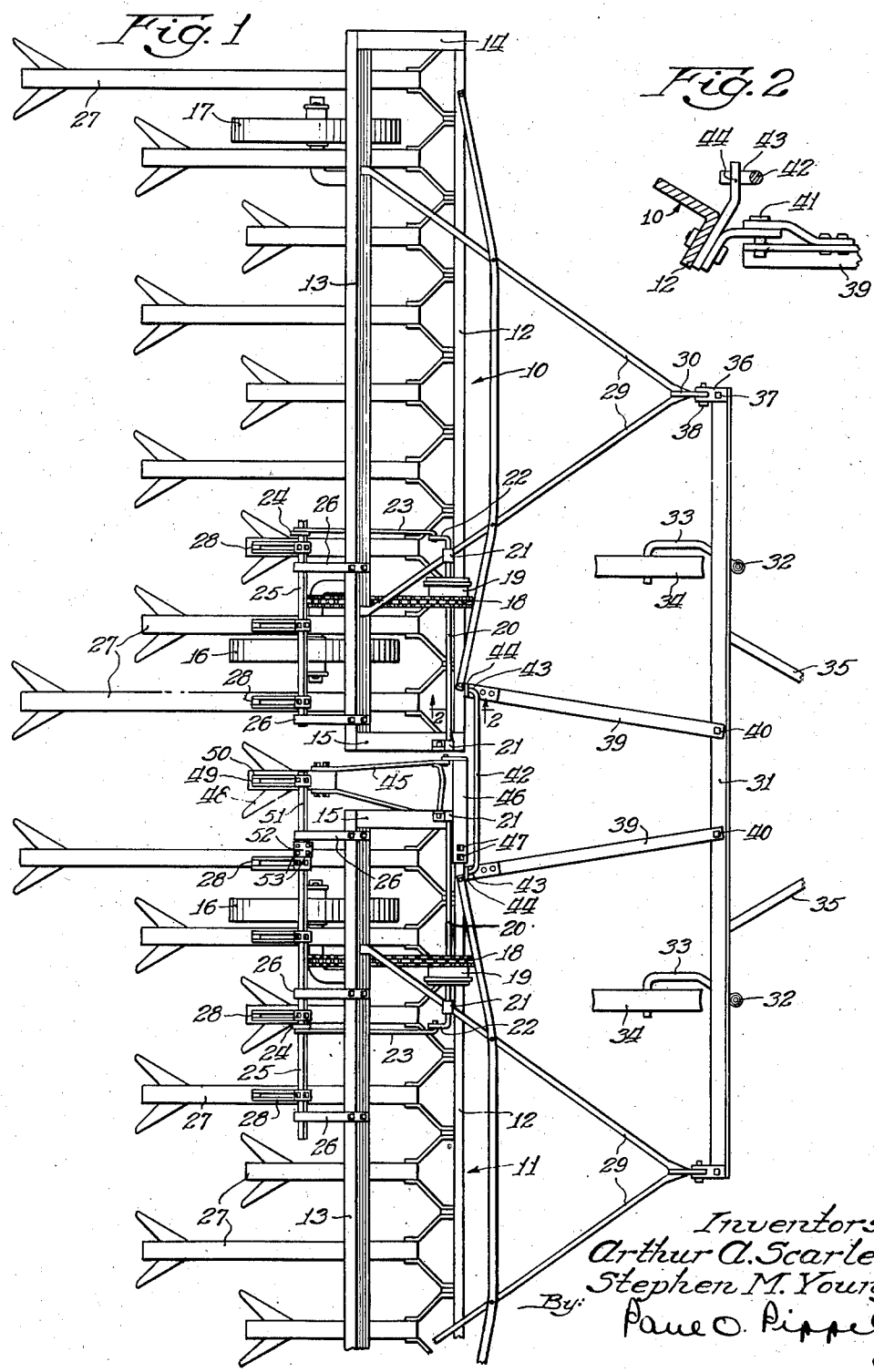

Patented June 5, 1945

2,377,578

UNITED STATES PATENT OFFICE 2,377,578

AGRICULTURAL IMPLEMENT

Arthur A. Scarlett, Hamilton, Ontario, and Stephen M. Young, South Hamilton, Ontario, Canada, assignors, by mesne assignments, to International Harvester Company, Chicago, Ill., a corporation of New Jersey Application October 10, 1942, Serial No. 461,550

4 Claims. (Cl. 97—235)

This invention relates to an agricultural implement and more particularly to an implement of the field cultivator type. More especially the invention pertains to improvements in field cultivators of the duplex type.

The use of a duplex cultivator or other machine involves the arrangement of a pair of cultivators in transversely alined, side-by-side relationship, together with hitch means by which the cultivators are connected together for operation together. Various problems arise in the use of such machines and in the construction of means for connecting the cultivator frames for advance together. The most significant of these problems center about the connection between the inner sides of the frames so that the frames may operate as closely as possible in their normal manner. Such means should preferably permit the rise and fall of each cultivator independently of the other. This is particularly true where each cultivator is equipped with wheel-driven lift means for moving the cultivator tools between raised and lowered positions, since if the driving wheel for the lift means becomes lifted from the ground, because of its connection with the frame of the other cultivator, the lift means will not operate. It is also desirable to provide means restraining each cultivator from running ahead of or behind the other. It is also important that the connecting means between the cultivators be constructed in such manner that it may be readily attached and detached without affecting the individual usefulness of the cultivators.

It is, accordingly, the principal object of the present invention to provide improved means for connecting together a pair of agricultural machines for duplex operation.

An important object of the invention is to provide improved hitch means including a wheel-supported hitch frame.

Another important object is to provide means for connection between a pair of agricultural machines permitting the machines to function in duplex operation as nearly as possible in the same manner that such machines function individually.

Other objects of the invention are to provide a detachable and attachable hitch frame, as stated above, that will not interfere with the individual usefulness of the machines; to provide caster-wheel means for supporting the hitch frame; to provide means permitting desirable relative movement between the individual machines and to permit similar movement between each machine and the hitch frame; and to provide means for restraining one machine from running ahead of or behind the other.

Another object is to provide the hitch means and its component parts for use with field cultivators and in such instance to provide an extra, quickly detachable and attachable cultivator tooth to be disposed in the vicinity of the adjacent near sides of the cultivator frames; and it is a still further object to provide the extra tooth with detachable connections to the raising and lowering means for the cultivator tools for one of the cultivators.

Other objects and features of the invention will become apparent from the following detailed description and accompanying sheets of drawings, in which:

Figure 1 is a plan view of a duplex cultivator embodying the principles of the invention;

Figure 2 is an enlarged fragmentary sectional view taken on the line 2—2 of Figure 1;

Figure 3 is a perspective view of the inner portion of one cultivator, showing the arrangement of an extra cultivator tool;

Figure 4 is a perspective view of the detached extra tool; and

Figure 5 is an enlarged fragmentary view of one of the connections between the cultivators.

Although the invention is illustrated and described with reference to a duplex cultivator, it will be understood that the principles of the invention are similarly applicable in other instances and that the disclosure is, therefore, illustrative and not limiting. As shown in Figure 1, the duplex machine comprises a pair of cultivators 10 and 11 disposed in transversely alined, side-by-side relationship with their adjacent inner ends spaced slightly transversely apart. Each cultivator includes a generally rectangular frame comprising a transverse front member 12, a transverse rear member 13, an outer end or side member 14, and an inner side or end member 15. It will be understood that the cultivators 10 and 11 may be identical and, as a matter of fact, are preferably of standard construction. Accordingly, the description of one applies equally to both.

Each cultivator is carried on a pair of transversely spaced apart inner and outer ground wheels 16 and 17, respectively, the outer wheel 17 of the cultivator 11 being omitted from the drawings. The inner wheel 16 of each cultivator preferably drives a chain 18 that is connected to a power lift 19, preferably of the conventional half-revolution type. Each power-lift means includes a transverse rotatable shaft 20 supported adjacent its opposite ends in transversely spaced apart bearings 21. The outer end of each shaft 20 is provided with a crank 22 connected by a link 23 to an arm 24 carried on a transverse rock-shaft 25. This rock-shaft is supported rearwardly of the rear frame member 13 by a pair of rearwardly extending brackets 26. It will be understood, of course, that the power lift means may also be driven by the outer wheels, or by both the inner and outer wheels.

The front frame member 12 of each cultivator provides means for supporting on a transverse axis a plurality of rearwardly extending cultivator tools 27. These tools are mounted for movement between raised and lowered positions, and the power-lift means 19 is operative through the linkage previously described to effect this movement. The rock-shaft 25 carries a plurality of arms 28 thereon appropriately connected to raise and lower the tools 27 upon operation of the lift means 19. It will be understood that the rock-shafts 25 for each of the cultivators 10 and 11 extend respectively across the cultivator frames, portions of the rock-shafts having been omitted to simplify the disclosure. The construction just described may be more or less conventional or standard, and detail description and illustration of the parts thereof are believed unnecessary.

Each of the cultivators is provided with a hitch or draft means, which may be of conventional construction, and, in the present instance, each draft means is preferably the same as that employed during individual use of the cultivators. Each hitch means preferably comprises a pair of forwardly converging frame bars 29, rigidly secured at their rear ends and intermediate their ends to the cultivator frame and further cross-braced by a transverse brace. The forward ends of the bars 29 are secured together and to a hitch plate 30.

The hitch frame for connecting the cultivators together for duplex operation includes a main transverse hitch bar 31 including adjacent opposite ends vertical bearings 32 for the journaling respectively of the upright portions of crank axles 33 for caster wheels 34. The hitch bar 31 is thus wheel-supported independently of the cultivators 10 and 11. The bar includes forwardly extending hitch parts 35, which may be suitably connected to a tractor or other source of draft power.

The hitch bar 31 includes at each of its opposite ends means providing connections respectively to the hitch plates 30 of the cultivator hitches. Each means includes a clevis 36 pivoted loosely on a vertical axis by means of a pin 37 to the hitch bar 31 and pivoted loosely on a transverse pivot axis by a pin 38 to the hitch plate 30 at the forward ends of the hitch members 29 of the cultivators. The hitch frame further includes a pair of forwardly extending links 39, each of which is pivotally connected at its forward end by a vertical pivot pin 40 to an intermediate portion of the hitch bar and each of which is pivoted at its rear end by a vertical pivot pin 41 to the forward frame member 12 of a cultivator (Figure 2). It will be seen by the construction described thus far that the cultivators 10 and 11 are connected together by the hitch bar 31 and its component parts for advance together for duplex operation. It will be noted that the looseness of the connection between the hitch bar 31, and each pair of hitch members of each cultivator allows sufficient play to provide for a generally universal twisting movement between the hitch frame and the cultivators, it being understood that the hitch members 29 of the cultivators are comparatively rigid with the respective cultivator frames. It will be seen also that comparatively free movement in general is permitted between each of the cultivators and between the cultivators and the hitch frame, although the connection between the hitch frame and the cultivators, particularly the links 39, is such as to restrain either cultivator from running ahead of or behind the other.

According to the present invention, a further connection is made between the cultivators. This connection preferably takes the form of a transverse link 42 having its opposite ends bent, as at 43, and pivotally connected respectively on transversely spaced, parallel longitudinal axes to the front frame members 12 respectively of the cultivators 10 and 11. The connection between each end of the link and each cultivator is made by a bracket 44 carried by the front frame member 12 of the cultivator (Figure 2). This link serves to restrain the cultivators against transverse movement toward or away from each other. At the same time, the connection is such as to permit the free rise and fall bodily of each cultivator independently of the other as the ground wheels 16 and 17 encounter varying ground contour. As previously stated, this arrangement is important from the standpoint of providing for the maintaining of the ground wheels in contact with the ground. Not only does this provide for the proper supporting of the cultivators independently of each other, but it also insures the engagement of the ground by the wheels 16, which drive the power-lift means 19. Former constructions were characterized by connecting means in which this free relative movement was not provided for, with the result that the raising of one cultivator very often caused the raising of the other cultivator.

Another feature of the invention is the provision of an extra detachable tool. This tool preferably takes the form of a rearwardly extending beam 45 pivotally connected on a transverse axis at its forward end to a supplemental frame member 46. One end of this member preferably fits over and is detachably secured, as by bolts 47, to the forward frame member 12 at the inner side of the cultivator 11. The rear end of the beam 45 is provided with a cultivator shovel 48 and with an upwardly extending lift link 49 connected at its upper end to a lift arm 50. The forward end of the lift arm is rigidly carried on a short rock-shaft section 51 having at its other end means providing for the detachable connection of the rock-shaft section to the rock-shaft 25 of the cultivator 11. The connecting means preferably takes the form of a pair of plate members 52 adapted to be clamped together by bolts 53 to the inner end of the rock-shaft 25, this being easily accomplished because the rock-shaft 25 and rock-shaft section 51 are square in cross-section.

The construction just described provides an extra, detachable cultivator tool adapted to be carried by the cultivator 11 and including lifting connections adapted to be operatively connected to the raising and lowering means of the cultivator 11. The shovel 48 on the beam 45 is preferably located rearwardly of the space between the inner sides of the frame members 15 of the cultivators 10 and 11 and is so arranged as to provide equal spacing with respect to the standard cultivator tools 27. It will thus be seen that the duplex cultivator will not leave any uncultivated portions in the field.

I will be seen from the foregoing description that the invention has provided an improved construction by which individual or standard agricultural machines may be connected together for duplex operation, and that the means for connecting the machines together is so arranged that its construction and use does not interfere with the detachment of the machines therefrom and the use of the machines individually. An important feature of this aspect of the invention is the extra tool adapted to be detachably connected to one of the cultivator frames and including the detachable connections to the lifting and lowering means for the standard tools of the cultivator. It will be appreciated that the principles embodied in the detachability of the tool 48 and its association with the lift mechanism of the cultivator may be similarly embodied in other machines and similarly connected to movable parts or operative elements of such other machines.

Various other alterations and modifications may likewise be made in the preferred embodiment of the invention illustrated and described without departure from the spirit and scope of the invention as defined in the appended claims.

What is claimed is:

1. A field implement: comprising a pair of frame sections arranged in transversely alined, side-by-side relation with their adjacent inner ends spaced apart transversely; inner and outer wheels supporting one frame section and inner and outer wheels supporting the other frame section, each section being thereby supported independently of the other; agricultural tools mounted on the frame sections for movement between raised and lowered positions; means on each section for raising and lowering the respective tools; means connecting the raising and lowering means of one section to one of the wheels of that section, and means connecting the raising and lowering means of the other section to one of the wheels of said section, each of said means being operative independently of the other; a detachable agricultural tool disposed between the spaced-apart inner sides of the sections and connected to one section for movement between raised and lowered positions; means detachably connecting said tool to the raising and lowering means of one of the sections; and means connecting said sections for advance together, including a connection permitting each frame section to rise and fall bodily independently of the other as the respective wheels encounter varying ground contour.

2. A field implement: comprising a pair of frame sections arranged in transversely alined, side-by-side relation with their adjacent inner ends spaced apart transversely; inner and outer wheels supporting one frame section and inner and outer wheels supporting the other frame section, each section being thereby supported independently of the other; agricultural tools mounted on the frame sections for movement between raised and lowered positions; means on each section for raising and lowering the respective tools; means connecting the raising and lowering means of one section to one of the wheels of that section, and means connecting the raising and lowering means of the other section to one of the wheels of said section, each of said means being operative independently of the other; a detachable agricultural tool disposed between the spaced-apart inner sides of the sections and connected to one section for movement between raised and lowered positions; means detachably connecting said tool to the raising and lowering means of one of the sections; hitch means cross-connecting the frame sections for advance together, including a connection permitting each frame section to rise and fall bodily independently of the other as the respective wheels encounter varying ground contour; and wheel means supporting the hitch means.

3. For a duplex field cultivator including a pair of cultivators disposed in side-by-side relation with their inner sides spaced transversely apart, each including inner and outer ground wheels, cultivator tools mounted for raising and lowering, wheel-driven raising and lowering means for the tools, and a forwardly extending hitch element: means connecting the cultivators together for advance together, comprising a transverse hitch bar disposed across the cultivator hitch elements; means connecting each hitch element to the hitch bar to permit relative universal twisting movement between the hitch bar and the hitch elements; caster wheel means supporting the hitch bar; means connecting the cultivators at their inner sides, including a connection permitting the rise and fall of each cultivator independently of the other as the respective ground wheels encounter varying ground contour; and an extra detachable cultivator tool disposed between the inner sides of the cultivators and connected to one of the cultivators, and including a detachable operating connection to one of the raising and lowering means.

4. For a duplex field cultivator including a pair of cultivators disposed in side-by-side relation with their inner sides spaced transversely apart, each including inner and outer ground wheels, cultivator tools mounted for raising and lowering, wheel-driven raising and lowering means for the tools, and a forwardly extending hitch element: means connecting the cultivators together for advance together, comprising a transverse hitch bar disposed across the cultivator hitch elements; means connecting each hitch element to the hitch bar to permit relative universal twisting movement between the hitch bar and the hitch elements; caster wheel means supporting the hitch bar; means connecting the cultivators at their inner sides, including a connection permitting the rise and fall of each cultivator independently of the other as the respective ground wheels encounter varying ground contour; and an extra detachable cultivator tool connected to one of the cultivators, and including a detachable operating connection to one of the raising and lowering means.

ARTHUR A. SCARLETT.
STEPHEN M. YOUNG.